US010053828B2

(12) United States Patent
Baxter et al.

(10) Patent No.: US 10,053,828 B2
(45) Date of Patent: Aug. 21, 2018

(54) ASSEMBLY AND PROCESS FOR CREATING AN EXTRUDED MARINE DOCK BUMPER

(71) Applicant: U.S. Farathane Corporation, Auburn Hills, MI (US)

(72) Inventors: Kevin Charles Baxter, Goodrich, MI (US); Timothy John Brown, Bruce Township, MI (US); Tobin Joseph Fauser, Novi, MI (US); Zachary Taylor, Windham, ME (US)

(73) Assignee: U.S. Farathane Corporation, Auburn Hills, MI (US)

( * ) Notice: Subject to any disclaimer, the term of this patent is extended or adjusted under 35 U.S.C. 154(b) by 179 days.

(21) Appl. No.: 15/163,177

(22) Filed: May 24, 2016

(65) Prior Publication Data

US 2016/0263807 A1    Sep. 15, 2016

Related U.S. Application Data

(63) Continuation-in-part of application No. 14/817,278, filed on Aug. 4, 2015, now Pat. No. 9,744,710, which
(Continued)

(51) Int. Cl.
*B29C 47/02*    (2006.01)
*B29C 47/90*    (2006.01)
(Continued)

(52) U.S. Cl.
CPC .......... *E02B 3/26* (2013.01); *B29C 47/0028* (2013.01); *B29C 47/0066* (2013.01);
(Continued)

(58) Field of Classification Search
CPC ......... E02B 3/26; B63B 59/02; B29C 47/003; B29C 47/0045; B29C 47/026
See application file for complete search history.

(56) References Cited

U.S. PATENT DOCUMENTS 2,910,033 A * 10/1959 Weisburg ................ B63B 59/02
114/219
2,959,146 A    11/1960 Erkert
(Continued)

FOREIGN PATENT DOCUMENTS

CH            658513 A5    11/1986
DE         19625114 A1    12/1997
(Continued)

*Primary Examiner* — William P Bell
(74) *Attorney, Agent, or Firm* — Dinsmore & Shohl LLP

(57) ABSTRACT

An assembly and process for forming a two stage extrusion of an elongated marine dock from a plasticized material, such as including but act limited to extruding a first generally "L" shaped bracket from a first more rigid thermoplastic, following which a cross head die arrangement is utilized in order to extrude a secondary arcuate and flexible material in extending fashion from a lower side of the "L" bracket. The secondary/flexible elastomer is extracted in an open flexed position relative to the first extruded bracket, and further such that, following completion, can be flexed into a closed engagement with an upper perpendicularly extending side of the bracket.

18 Claims, 15 Drawing Sheets

Related U.S. Application Data is a continuation of application No. 13/726,771, filed on Dec. 26, 2012, now Pat. No. 9,162,387.

(60) Provisional application No. 61/586,464, filed on Jan. 13, 2012.

(51) Int. Cl.

| | | |
|---|---|---|
| *B63B 59/02* | (2006.01) | |
| *E02B 3/26* | (2006.01) | |
| *B29C 47/00* | (2006.01) | |
| *B29C 47/04* | (2006.01) | |
| *B29C 47/06* | (2006.01) | |
| *B29C 47/28* | (2006.01) | |
| *B29C 47/88* | (2006.01) | |
| *B29C 47/92* | (2006.01) | |
| *F24J 3/08* | (2006.01) | |
| *B29K 23/00* | (2006.01) | |
| *B29L 31/00* | (2006.01) | |
| *B29L 23/00* | (2006.01) | |
| *B29C 47/10* | (2006.01) | |
| *F28F 21/06* | (2006.01) | |

(52) U.S. Cl.
CPC ........... *B29C 47/021* (2013.01); *B29C 47/04* (2013.01); *B29C 47/065* (2013.01); *B29C 47/28* (2013.01); *B29C 47/882* (2013.01); *B29C 47/8895* (2013.01); *B29C 47/92* (2013.01); *B63B 59/02* (2013.01); *F24J 3/083* (2013.01); *B29C 47/003* (2013.01); *B29C 47/0052* (2013.01); *B29C 47/0059* (2013.01); *B29C 47/0064* (2013.01); *B29C 47/0071* (2013.01); *B29C 47/1036* (2013.01); *B29C 47/8835* (2013.01); *B29C 2793/009* (2013.01); *B29C 2947/92209* (2013.01); *B29C 2947/92647* (2013.01); *B29C 2947/92704* (2013.01); *B29K 2023/065* (2013.01); *B29L 2023/22* (2013.01); *B29L 2031/721* (2013.01); *B63B 2735/00* (2013.01); *F28F 21/062* (2013.01); *Y02E 10/125* (2013.01)

(56) References Cited

U.S. PATENT DOCUMENTS

| | | |
|---|---|---|
| 3,057,013 A | 10/1962 | Loveless |
| 3,473,194 A | 10/1969 | Farrow |
| 3,928,903 A | 12/1975 | Richardson et al. |
| 4,084,533 A | 4/1978 | Boyer |
| 4,157,194 A | 6/1979 | Takahashi |
| 4,964,760 A | 10/1990 | Hartman |
| 5,027,736 A | 7/1991 | Drews |
| 5,626,807 A | 5/1997 | O'Halloran |
| 5,730,077 A * | 3/1998 | Nunes ............... B63B 59/02 114/219 |
| 5,743,204 A | 4/1998 | Tweet |
| 5,792,529 A * | 8/1998 | May ............... B32B 5/08 428/36.2 |
| 5,807,639 A * | 9/1998 | Frappier ........... B29C 45/1657 428/475.5 |
| 5,829,378 A | 11/1998 | Nunes et al. |
| 5,836,134 A | 11/1998 | Couto et al. |
| 6,095,074 A | 8/2000 | Reinhardt |
| 6,620,354 B1 | 9/2003 | Bessemer et al. |
| 6,655,824 B2 | 12/2003 | Tufte |
| 6,733,161 B2 | 5/2004 | Tufte |
| 6,817,731 B2 | 11/2004 | Tufte |
| 6,832,570 B2 | 12/2004 | Aschenbach |
| 6,948,440 B2 | 9/2005 | Aschenbach |
| 7,258,472 B2 | 8/2007 | Tufte |
| 7,784,419 B2 | 8/2010 | Bigler et al. |
| 8,029,209 B2 | 10/2011 | Aschenbach |
| 8,262,322 B2 | 9/2012 | Desmeules |
| 8,480,333 B2 | 7/2013 | DeMay |
| 8,567,333 B2 | 10/2013 | Berman et al. |
| 2004/0016382 A1 * | 1/2004 | Aschenbach ........... B63B 59/02 114/219 |
| 2006/0075951 A1 | 4/2006 | Aschenbach |
| 2006/0130727 A1 | 6/2006 | Eischeid |
| 2006/0201293 A1 | 9/2006 | Tufte |
| 2010/0180593 A1 | 7/2010 | Schaller et al. |
| 2011/0011558 A1 | 1/2011 | Dorrian et al. |
| 2011/0058902 A1 | 3/2011 | Barbeau et al. |
| 2011/0232795 A1 | 9/2011 | Hardin |
| 2012/0125560 A1 | 5/2012 | McKeown et al. |
| 2012/0186672 A1 | 7/2012 | Fisenko et al. |
| 2012/0282032 A1 | 11/2012 | Desmeules |
| 2012/0312016 A1 | 12/2012 | Lawes |
| 2013/0101492 A1 | 4/2013 | McAlister |
| 2014/0030028 A1 | 1/2014 | DeMay |
| 2015/0152616 A1 | 6/2015 | Taylor |

FOREIGN PATENT DOCUMENTS

| | | |
|---|---|---|
| EP | 2208954 A2 | 7/2010 |
| EP | 2385328 A2 | 11/2011 |
| GB | 1154259 A | 6/1969 |
| JP | 02-011218 | 1/1990 |

* cited by examiner

ASSEMBLY AND PROCESS FOR CREATING AN EXTRUDED MARINE DOCK BUMPER

CROSS-REFERENCE TO RELATED APPLICATIONS

This application is a Continuation-in-Part of application Ser. No. 14/817,278, filed Aug. 4, 2015, which is in turn a Continuation-in-part of application Ser. No. 13/726,771 filed on Dec. 26, 2012. Application Ser. No. 13/726,771 claims the benefit of U.S. Provisional Application 61/586,464 filed on Jan. 13, 2012, the contents of which are incorporated herein in their entirety.

FIELD OF THE INVENTION

The present invention discloses both an assembly and process for sequential two stage extrusion of an elongated marine dock from a plasticized material. Such as including but not limited to extruding a first generally "L" shaped bracket from a first more rigid thermoplastic, such as including but not limited to HDPE (high density polyethylene), following which a cross head die arrangement is utilized in order to extrude a secondary arcuate (typically parabolic shaped) and flexible material, such as a TPE or other flexible elastomer, in extending fashion front a lower side of the "L" bracket. The secondary/flexible elastomer is extruded in an open flexed position relative to the first extruded bracket, and further such that, following completion and mounting to an edge of a dock structure, can be flexed into a closed engagement with an upper perpendicularly extending side of the bracket. In order to establish an impact force absorbing and deflecting construction, such as in response to contact from a marine craft or the like.

BACKGROUND OF THE RELEVANT ART

The prior art is documented examples of dock or marine craft mounted bumpers, these utilizing some version of force absorption and/or illumination. Notable among these is the light altering bumper device of Taylor 2015/0152616, this including an illuminating dock bumper for attachment to a dock and exhibiting an elongate, body with a main attachment bracket portion and a secondary parabolic arch shaped portion.

U.S. Pat. No. 8,567,333, to Berman, teaches a protective boat rub rail system for a vessel and including a rigid track extrusion attached to the vessel, as well as a flexible fender extrusion and a shock absorbing inner core. The inner core is disposed in the fender extrusion and the core is substantially softer than the fender extrusion. The fender extrusion is configured to matingly engage the track extrusion. The fender extrusion has an upper barb engaging an upper receiving cavity of the track extrusion and a lower barb engaging a lower receiving cavity of the track extrusion. The track extrusion has ah upper tang engaging an upper recess of the fender extrusion and a lower tang engaging a lower recess of the fender extrusion. The track extrusion also includes an upper lip configured to engage a top portion of the perimeter of the vessel and a lower lip configured to engage a lower portion of the perimeter of the vessel.

SUMMARY OF THE INVENTION

The present invention discloses a two stage extrusion process for creating an elongated marine dock from a plasticized material, such as including but not limited to a first generally "L" shaped bracket from a first more rigid thermoplastic, such as which can include but is not limited to a HDPE (high density polyethylene), following which a cross head die arrangement is utilized in order to extrude a secondary arcuate and flexible material such as a TPE or other flexible elastomer, in extending fashion from a lower side of the "L" bracket. The "L" shaped bracket is initially shaped and cooled in the first stage extrusion on process, following which it enters the cross head die at which the secondary/flexible and parabolic shaped elastomer portion is extruded in an open flexed position relative to the lower adjoining side of the first stage extruded bracket.

Upon completion, the secondary elastomer portion can be flexed into a closed engagement with a pre-extruded feature associated with an upper perpendicularly extending side of the bracket. A forward facing surface of the lower bracket side can further be extruded with additional features in order allow post-securement of such items a LED lighting or the like.

Other steps include linearly drawing and any of spray, immersion or other types of cooling of the dual stage dock bumper, as well as sectioning and stacking the bumper sections. Each of guide shape retention, cold-water spray or immersion hardening, cutting steps are provided for creating a plurality of individual sections which are on site assembleable, such as in end-to-end fashion along a perpendicularly angled dock edge.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 16:
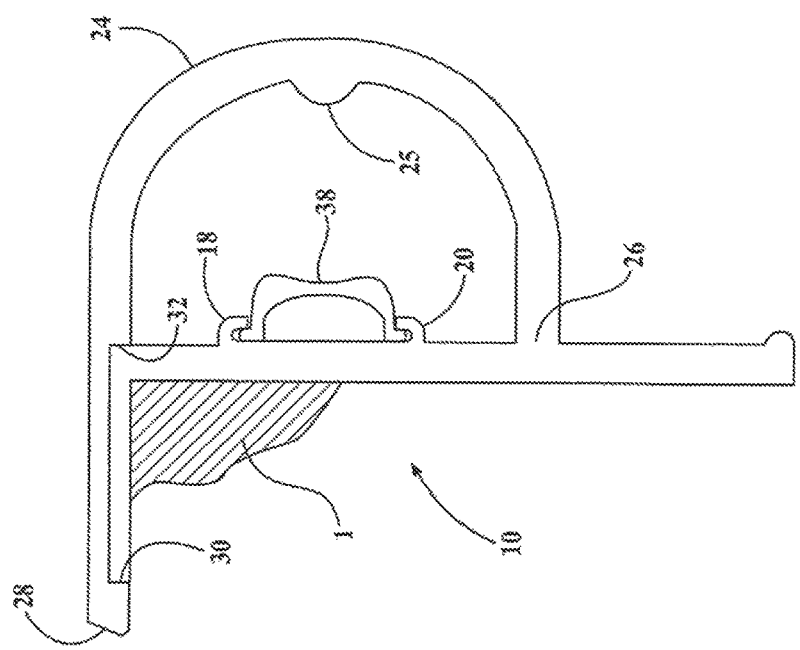
FIGS. 15 and 16 illustrate a pair of end plan views of a non-limiting example of a marine dock bumper produced according to the extrusion process of the present invention, with FIG. 15 depicting an initially extruded configuration with the second stage parabolic shaped elastomeric portion in an open arrayed configuration relative to the first stage conjoined bracket, FIG. 16 depicting the installation of an LED element to an extruded feature of the lower side of the first bracket, a latch end of the second stage elastomeric portion being pivoted into engagement with a further extruded feature associated with the top interconnected side of the bracket.
Figure 15:
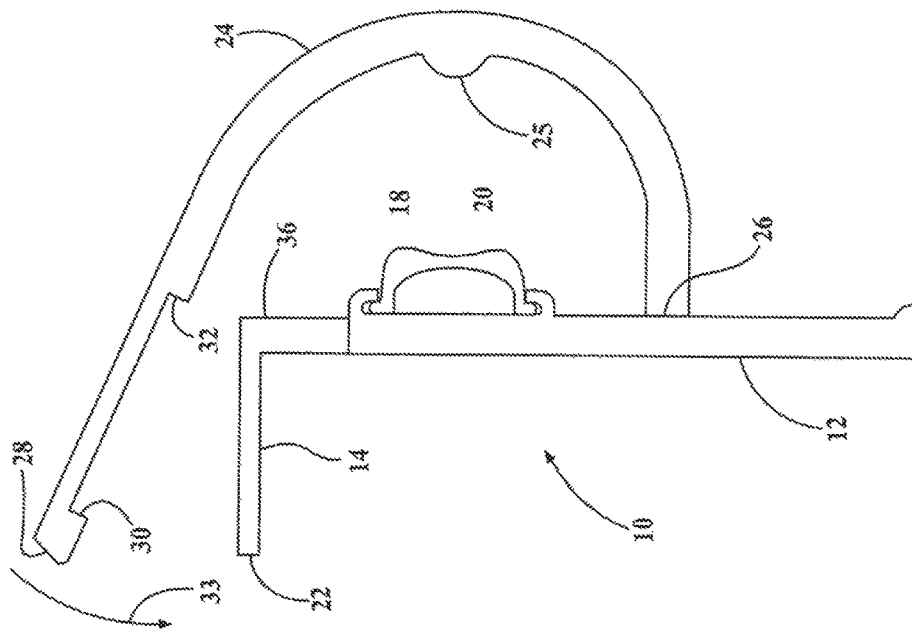

With reference to the following illustrations, the present invention discloses a sequential two stage extrusion assembly and process for creating such as a polymeric type marine bumper, see as generally shown at 10 in cross section in each of FIGS. 15-16. The present invention is again directed to the extrusion process for creating the bumper, as opposed to the physical article itself, the physical shaping and features of which can be modified as a variable of the extrusion die forming mandrels (as will be further described) for shaping the first and second stage extrusions collectively defined by the bumper 10.

As previously described, and in one non-limited application, the bumper can be (but is not limited to) being extruded from two different materials including a first HDPE (high density polyethylene) material, employed for producing an "L" shaped mounting bracket (such as for securing to the angled edge of a deck). A second, more flexible or elastomeric thermoplastic (TPE or like) material exhibits a parabolic or other arcuate shaped second portion, with the first stage extrusion potentially including both color/painted and translucent portions and the second extension portion including any combination of clear and/or translucent portions.

As shown in example of the article in FIGS. 15-16, the first (harder material) bracket includes a lower side 12 and an upper interconnected side 14. As further shown, the lower side can include a contoured lower rounded end profile 16, the lower side further including a pair of spaced apart tab-like features 18/20 on an outwardly facing surface thereof. The upper interconnected side 14, typically at an "L" shaped angle relative to the lower side 12, concludes in a latch or angled rear edge 22.

The second (softer material) elastomeric and parabolic/arcuate extending portion 24 is second stage extrusion molded to the previously extruded and formed bracket, at an intermediate location 26 along the lower side 12 thereof. As will be better understood with reference to the succeeding description of the dual stage extrusion process of the present invention, the second stage parabolic shaped portion 24 is extruded in an open position relative to the first stage bracket (see again FIG. 15).

The elastomeric portion 24 can include any irregular cross sectional features, such exhibiting a bulbous intermediate location 25, with a terminating length of the elastomeric portion, proximate an extending end 28 thereof, exhibiting a cavity or recess configured underside with opposing underside ledges 30 and 32, this for permitting the arcuate portion 24 to be flexed downwardly (arrow 33), and so that the extending rear edge 22 (along with a farther adjoining edge 36 established between the upper 14 and lower 12 interconnected sides of the first stage extruded bracket), allows for closing the second stage parabolic portion 24 in the manner depicted in FIG. 16. Also depicted, is a clear lens or the like, at 38 which can be associated with the integration of lighting elements such as LED's or the like, mounted into a three dimensional extending track associated with the tab features 18/20 in the extruded first stage bracket.

Without limitation, the bracket is mounted to an angled and typically horizontally extending support surface generally represented at 1 in FIG. 16 and which can include a sea wall, dock or the like. Although not shown, the configuration of the marine bumper extrusion can further be such that other features not limited to electrical processors for controlling the lighting assemblies can be integrated into the construction of the extruded article.

Figure 1:
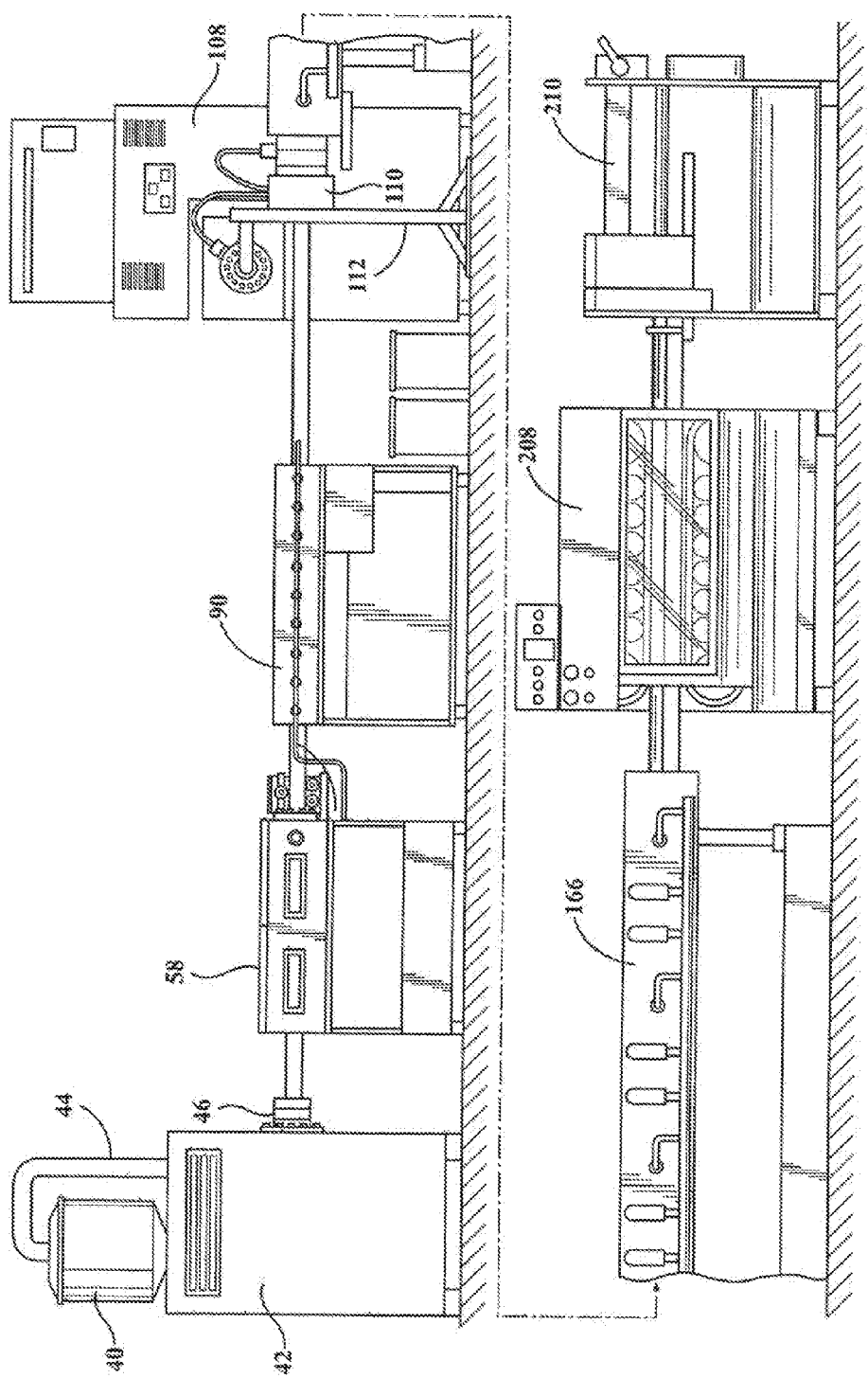
FIG. 1 is plan schematic of the overall assembly and process according to the present invention.
Figure 2:
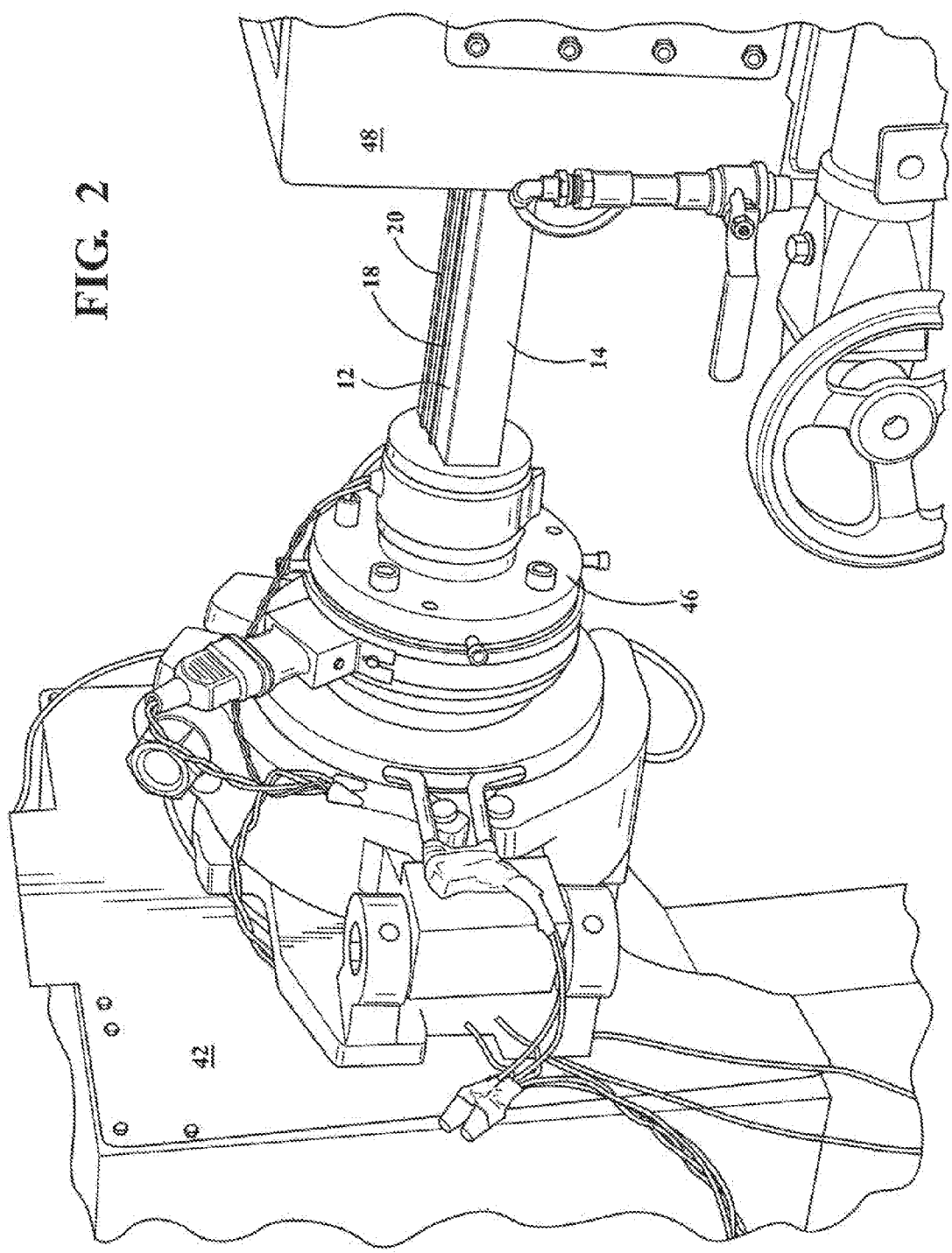
FIG. 2 is a perspective illustration of the first stage extruder for forming the "L" shaped bracket.
Figure 3:
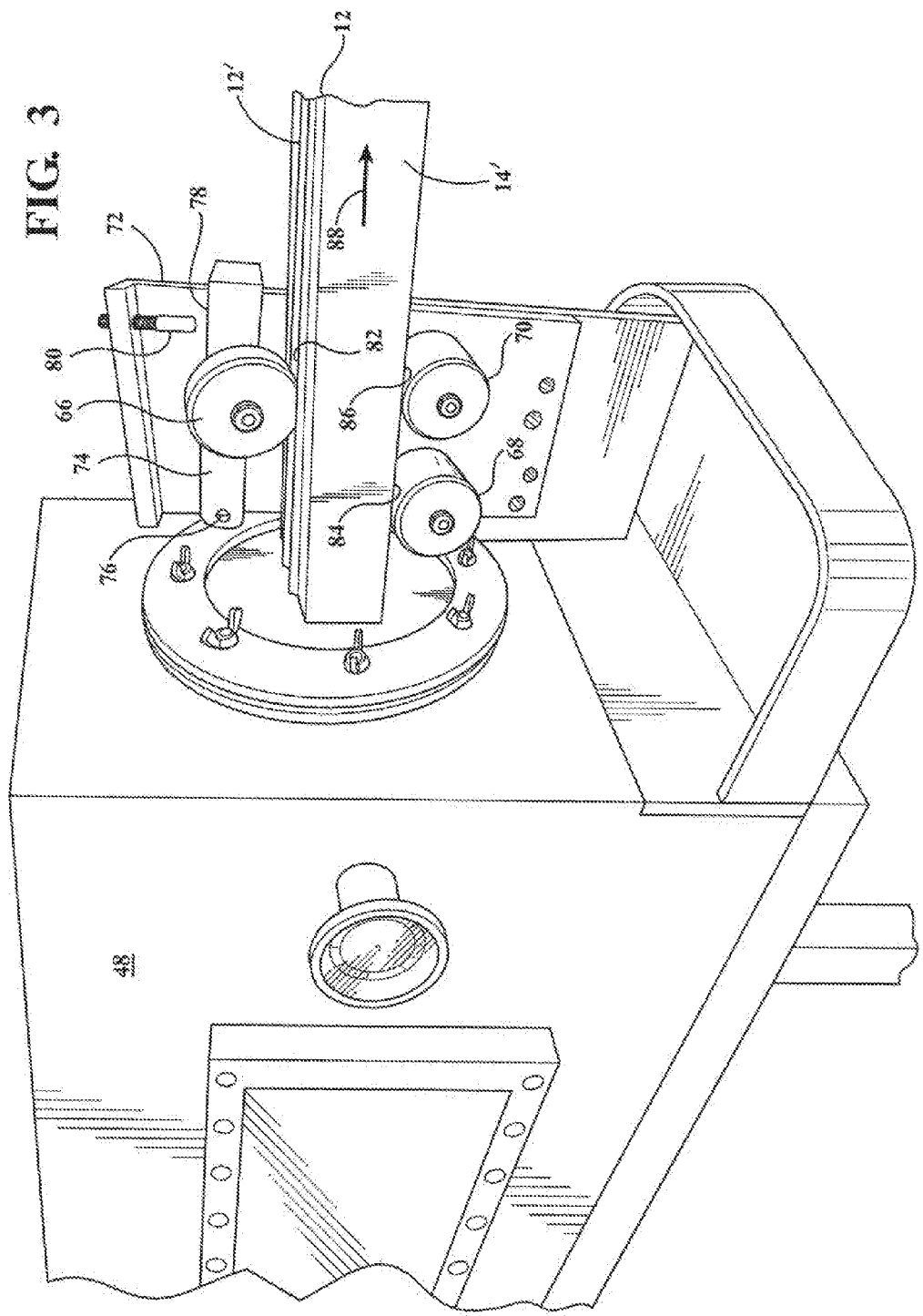
FIG. 3 is an illustration of a vacuum chamber through which the bracket passes after exiting the first extruder, an arrangement of upper and lower rollers communicating with the bracket at an outlet of the vacuum chamber for imparting a cross-sectional profile, such in order to compensate for heat induced deformation of the bucket during the subsequent crosshead die operation for extrusion forming the parabolic shaped softer second stage elastomeric material in engagement with bracket.
Figure 11:
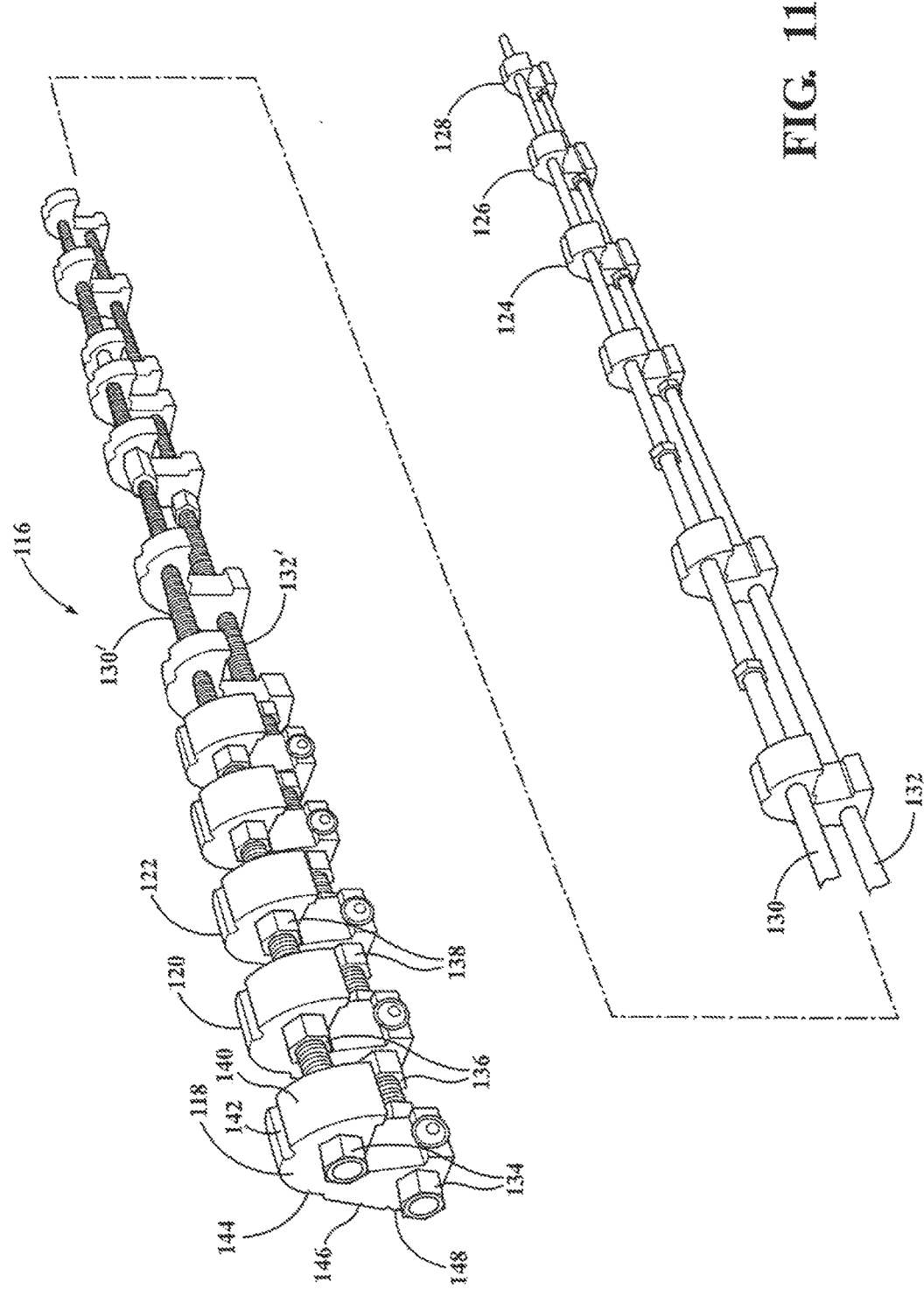
FIG. 11 is an elongated perspective view of the second stage die forming mandrel for extruding the elastomeric parabolic shaped portion onto the first stage bracket.
Figure 12:
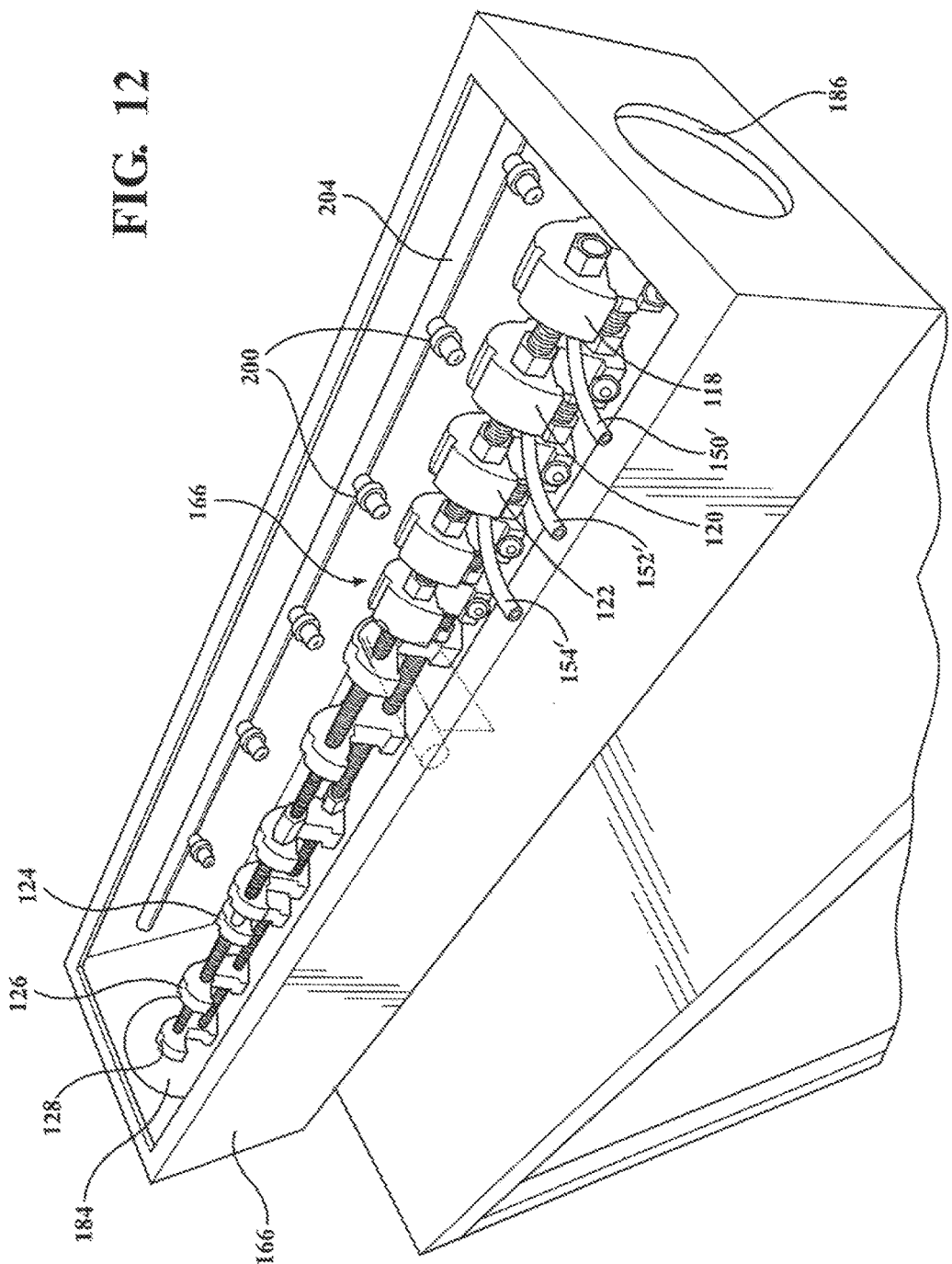
FIG. 12 is a further illustration of the cooling and shaping tank of FIG. 10 in combination with the second stage forming mandrel of FIG. 11.
Figure 13:
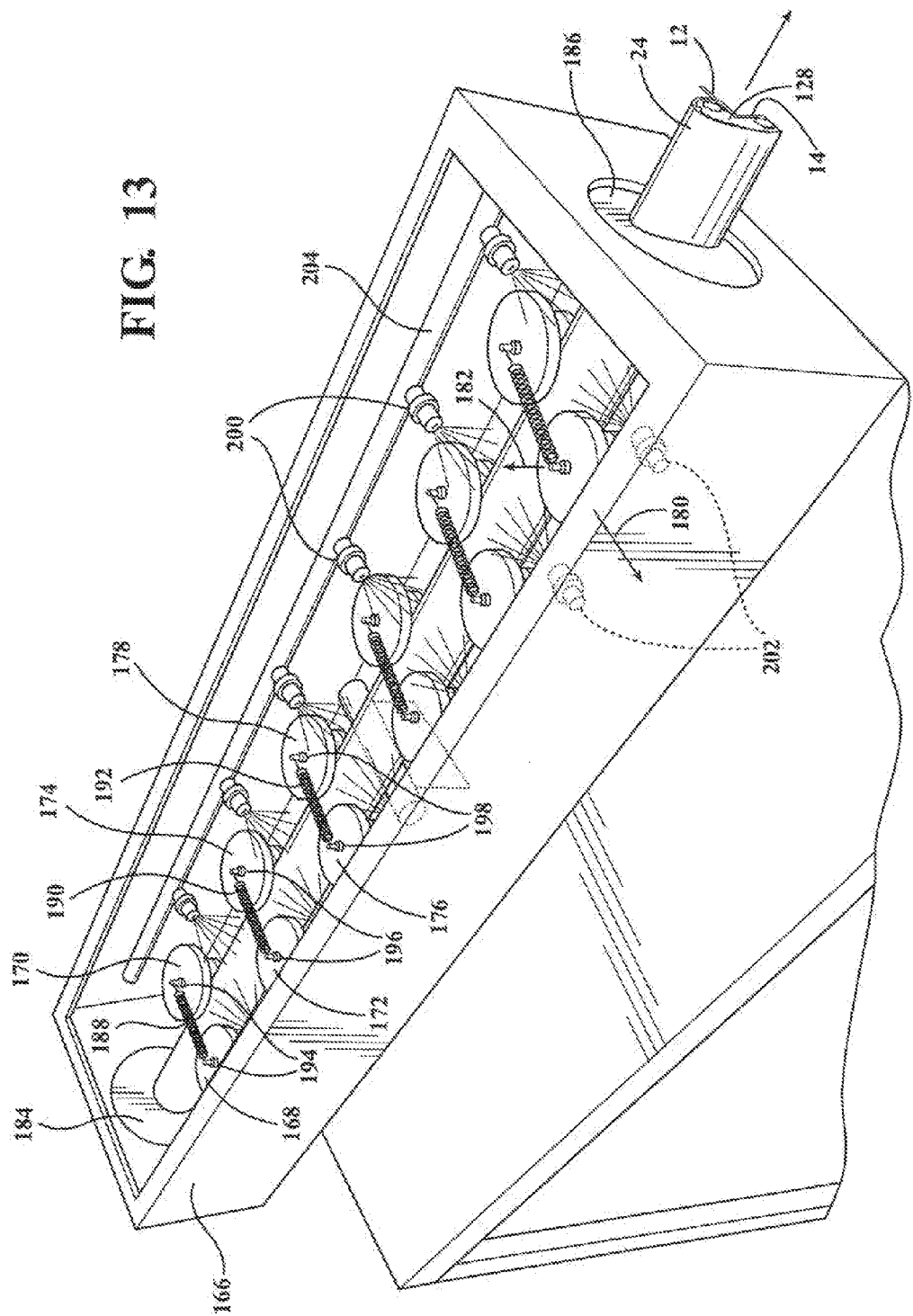
FIG. 13 is a downward looking perspective view of the cooling and shaping tank of FIG. 12 and further illustrating the pairs of spaced apart guiding spindles for assisting in transitioning the two stage extruded marine bumper from the parabolic shaped portion forming mandrel.
Figure 14:
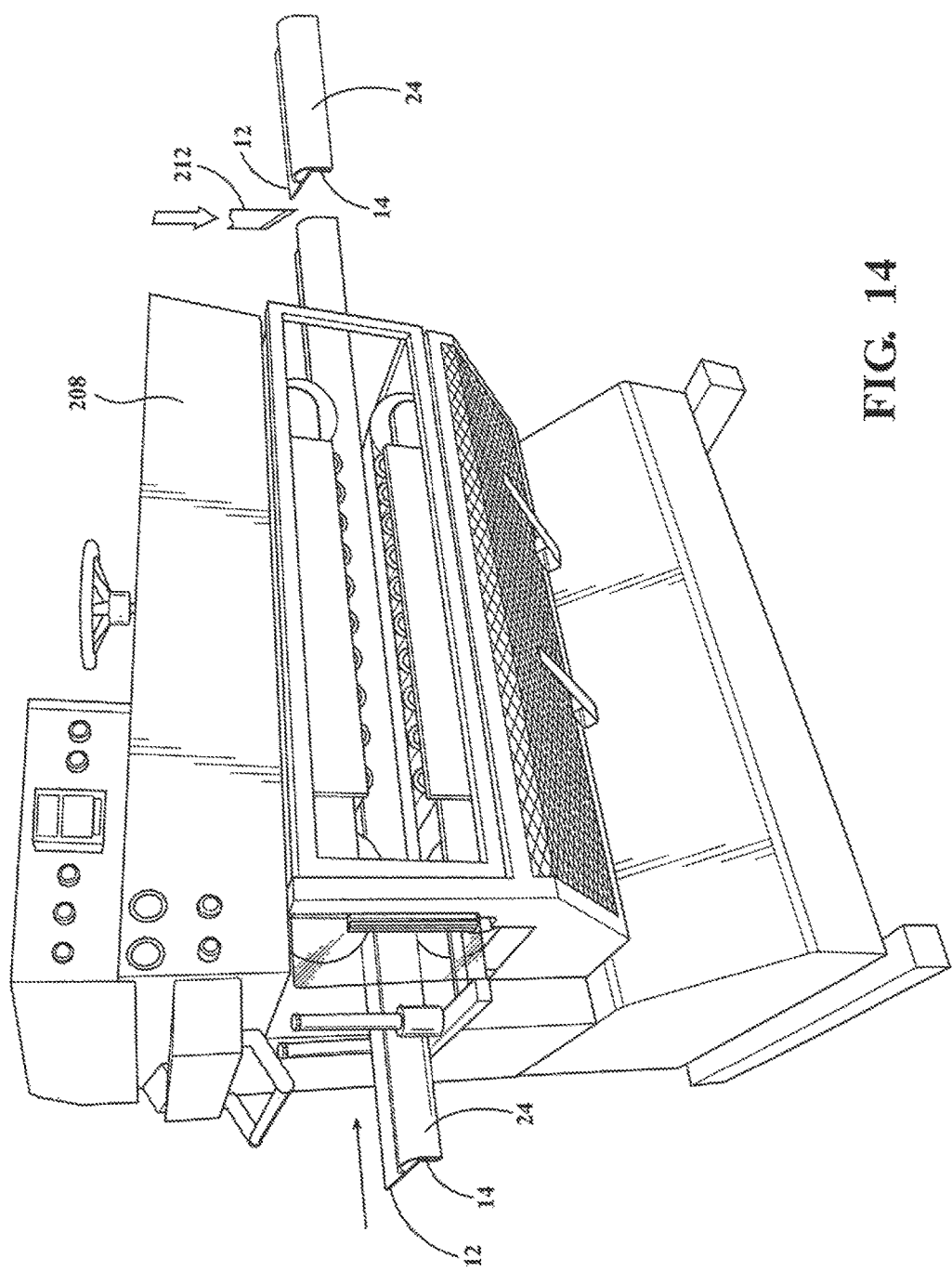
FIG. 14 is a puller assembly for assisting in drawing of the dual stage extruded marine bumper and which precedes a press for sectioning the finished pipe into predetermined lengths.

Having provided an adequate description of one non-limiting example of a marine bumper article produced by the present extrusion process, and referring to FIG. 1, an overall schematic of the overall assembly and process is shown according to one non-limiting embodiment of the present inventions, these being further described, in detail with additional reference to succeeding FIGS. 2-14, as well as additional post extruding and sectioning/routing stations set forth in FIGS. 12 and 13 respectively. A feed hopper assembly 40 contains a volume of extrudate material (including but not limited to an HDPE material, which can be in pellet or granulate form) and which is fed in a flowable form to in-fee hopper associated with the first or main extruder 42 via a feed line 44.

An extrusion die (also termed as any of a forming head or first mandrel) is shows at 46 associated with the first extruder 42 (see also FIG. 2) and which is heated and temperature controlled as knows in the art in order to extrude the interconnected sides 12/14 (as described in FIGS. 15-16) of the first "L" shaped bracket in a first extrusion operation, the initial stage extrusion of the tabbed locations 18/20 on the first side 12 for establishing the track for receiving the lighting track also being shown. As again shown in FIG. 2, a known arrangement of heating elements, thermo-electric coupling devices and other controls are provided in order to extrude the first "L" bracket through a disk shaped template configured within the forming head 46, such exhibiting a desired wall thickness and dimensions.

A vacuum chamber 48, which is depicted as having a generally three dimensional and rectangular shape, is provided in communication with an outlet of the first extruder 42 and for receiving the first rigid extruded "L" bracket. As further shown in FIG. 4, the vacuum chamber 48 includes a hinged lid 50 which, upon opening, reveals a plurality of disk shaped forming dies 52, 54, 56 arranged in linearly spaced fashion between inlet 58 and outlet 60 ends of the chamber 48.

Figure 4:
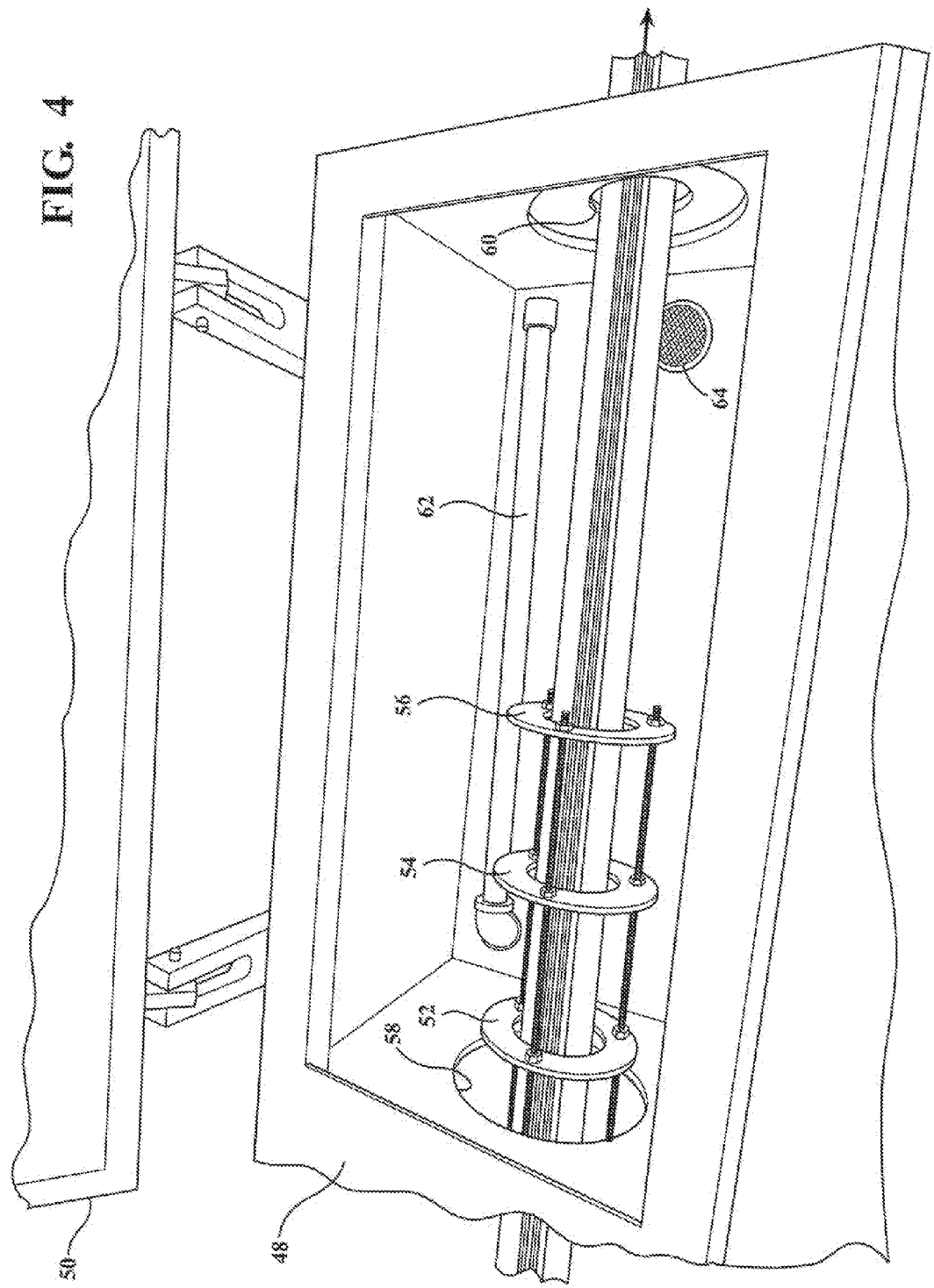
FIG. 4 is an illustration of an interior of the vacuum chamber of FIG. 3 and which depicts a plurality of progressing sizing dies for maintaining the first stage extruded bracket in its proper shape during cooling thereof.

The vacuum chamber 48 operates create a desired negative pressure within its interior (see extending fixture 62 and air evacuation passageway 64 in FIG. 4) this in order to maintain the "L" bracket component 12/14 in its proper shape while it cools. Located on an exterior of the chamber 48, in intercepting proximity to its outlet 60, are upper 66 and lower 68 and 70 spaced apart rollers, these further being rotatably supported upon a vertical shelf or bracket 72. The "L" bracket component 12/14, upon exiting the vacuum chamber 48, is intercepted between the lower rollers 68/70 (such as shown in fixed rotational support with the shelf 72) and the upper roller 66 which is both rotatably and pivotally supported a limited distance to a further bracket 74, in turn having an end pivot location 76 and an opposite (free end) abutment location 78, see further upper adjustable end stop 80 extending downwardly from the uppermost end of the shelf 72.

The purpose of the upper 76 and lower 78/80 spaced rollers is to flatten or reshape the first "L" shaped bracket component at first 82 and second 84/86 cross sectional locations as it passes through the rollers (see directional arrow 88) and so that the component acquires a modified cross sectional profile 12'/14'. The purpose of employing the rollers and of imparting the offset/flattened shaping to the profile has been found through trial and experimentation to compensate for the existence of any deformation experienced by the "L" bracket profile as it passes through the subsequent second extrusion stage crosshead die in proximity to the elongated mandrel for forming the second stage extruded arcuate/parabolic portion 24. For purposes of the present description, the use of the rollers 82 and 84/86 is optional (see again FIG. 4 which does not include a roller arrangement supported at an exterior outlet of the vacuum chamber 48) and it is further understood that other mechanisms are envisioned according to one of ordinary skill in the art for purposes of introducing an offset to the elongated profile 12'/14' while it is still in a heated and formable shape.

Following exiting of the vacuum chamber 48 and passing through the shape offset upper roller 66 and lower rollers 68/70, (see again directional arrow 88 in FIG. 3), the now deformed "L" bracket 12'/14' is fed through a cooling tank 90 (FIG. 5) for further cooling the first stage extruded "L" bracket utilizing a water spray. To this end, a plurality of nobles 92 are arranged in inward opposing fashion along each of the opposite length extending sides of the cooling tank, with water (or other coolant fluid) being communicated through lines (see at 94) which supply the plurality of spray nozzles.

Figure 5:
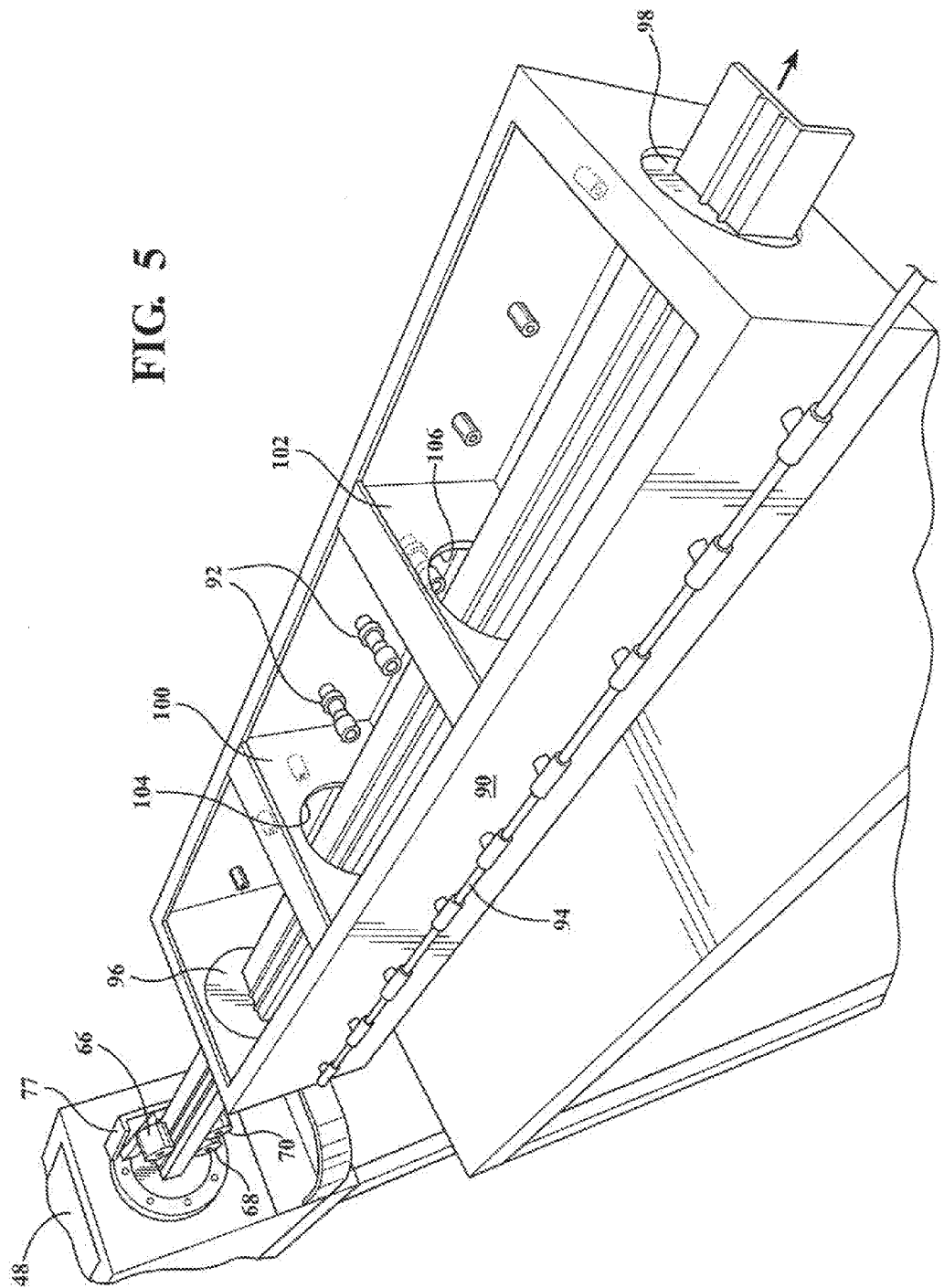
FIG. 5 is a succeeding secondary cooling tank operation for further cooling the first stage bracket utilizing a water spray.
Figure 6:
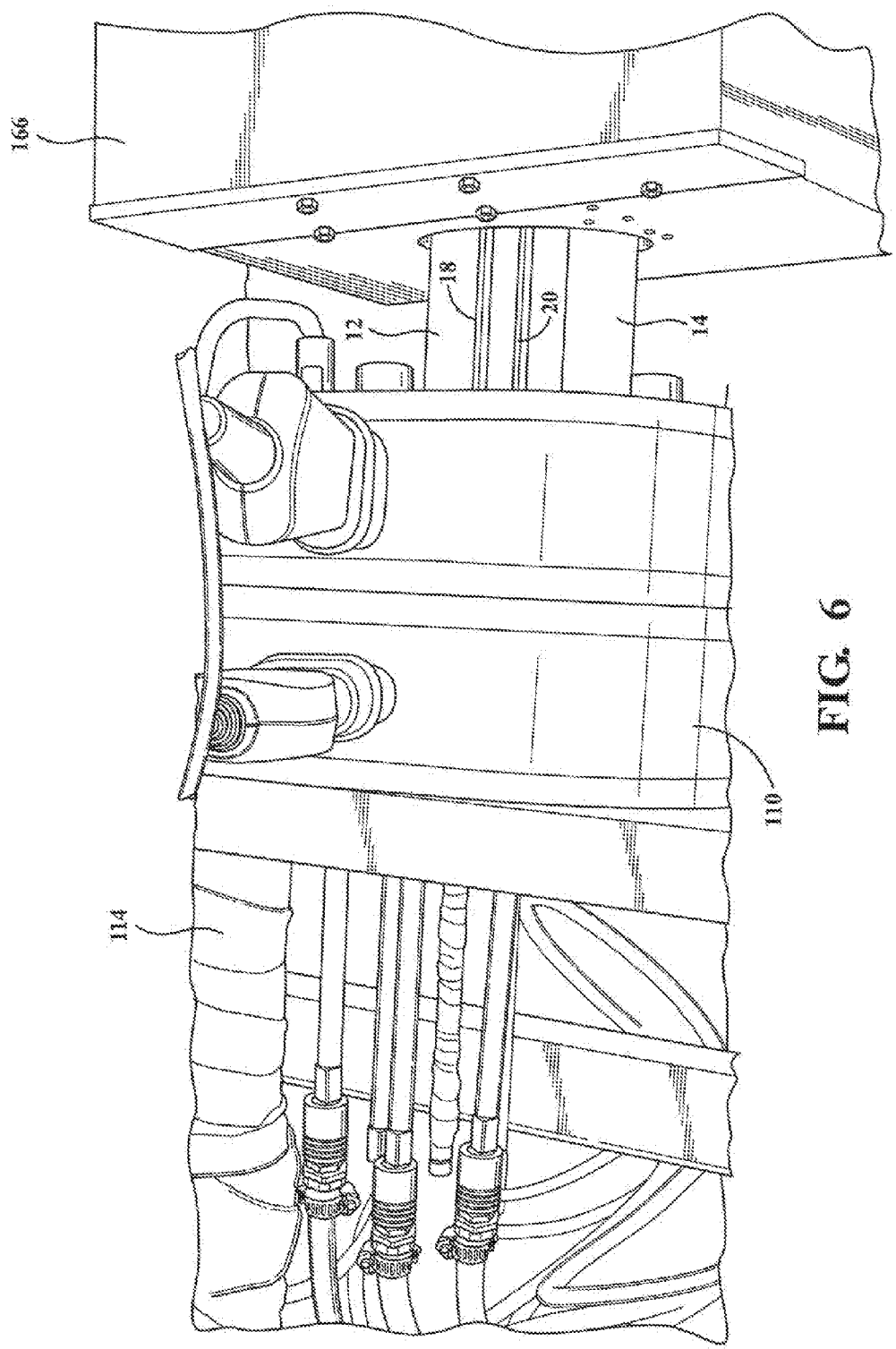
FIG. 6 is a first overhead perspective illustration of a cross head die operation following the second cooling tank, the cross head die including a pair of spaced and elongated mandrels between which traverses the first stage bracket to facilitate the second stage extrusion forming of the elastomeric and parabolic shaped portion.

As further shown in FIG. 5, the cooling station 90 (optional) includes inlet 96 and outlet 98 ends through which the angled bracket 12/14 passes. Additional partitions 100 and 102 are defined at interior locations of the cooling station 90 and include additional aligning passageways (at 104 and 106, respectively) through which bracket 12'/14' passes daring cooling and solidifying.

Referring again to FIG. 1, in combination with FIGS. 6-9, a second stage or co-extruder station 108 is located downstream of the main extruder 42 and, in the illustrated embodiment, beyond the optional cooling tank 90. The second stage extruder 108 includes a cross head die 110 supported in elevated fashion upon a stand 112 (again FIG. 1) and so as to be arranged in horizontal alignment with the "L" bracket. A second extruded material is fed from the second stage extruder 108 (such again including a melted and flowable TPE or other suitable plastic exhibiting the necessary properties of flexibility and resiliency) from a pipe or conduit (see at 114) in FIG. 8 to the cross head die 110 and so that the extrudate material flows through an internal template (not shown) defined within the cross die head.

The second extruder also includes an elongated mandrel, generally at 116 in the elongated perspective of FIG. 11 (such as which can be constructed of any aluminum or other suitable metal or like material) which extends from an outlet of the cross head die 110 and between which communicates the first stage extruded "L" bracket. As best shown in FIG. 11, mandrel 116 includes a plurality of laterally spaced apart and arcuate profile forming portions, beginning at 118, 120, 122, et seq. at an inception end proximate the cross head die 110, these being more closely spaced together at the inception end and gradually expanding to more spaced apart intervals, further at 124, 126, 128, et seq., and such further corresponding to the gradual solidification of the second arcuate portion 24.

The individual profile defining forming portions 118, 120, 122, . . . , 124, 126, 128 are spatially arranged via a pair of elongated stems 130 and 132. The stems can also each include an exteriorly threaded profile, see further at 130' and 132' in FIG. 11, these receiving pairs of threaded nuts 134, 136, 138, et seq. which are located on both sides of each forming portion 118, 120, 122, et seq., the forming portions likewise being aperture for receiving the stems 130/132 in extending fashion there through, with rotational to linear adjustability via the opposite surface adhering pairs of nuts in order to spatially inter-adjust the spatial positioning of the individual forming portions as desired based upon the parameters of the second stage extrusion process.

Each of the individual forming portions, see again as exemplary shown at 118, includes an arcuate forming surface further defined by each of a plurality of individual and interconnecting surface portions collectively defining the extruded profile of the elastomeric portion 24. These include a first surface portion 140 (defining the base connecting portion of the arcuate/parabolic elastomeric portion 24), a portion 142 defining the protuberant bump 25), a further portion 144 (defining an intermediate adjoining range of the portion 24), an embossed or raised portion 146 (defining the recessed underside cavity corresponding with inner ledge edges 30/32 in FIG. 15) and, finally, a last portion 148 defining latch end 28 of the arcuate portion.

Although not clearly shown, the second extrudate material delivered through the pipe 114 and such as which can again without limitation include any previously melted or flowable material which results in the arcuate second extruded portion 24 having the necessary flexibility and durability. This material is communicated to an interior of the die head 110, which is in turn configured to communicate the material via an inner profile or template such that it flows over and around each of the succeeding profile defining portions 118, 120, 122, et seq., over the course of which the second arcuate/parabolic portion 24 is formed in a manner in which its base end is integrated into the intermediate location of the lower bracket side (again at 26 in FIG. 15) and its extending end is originally extruded in free/open extending fashion as shown by the article configuration in FIG. 15 and the length looking perspective of FIG. 10.

Figure 7:
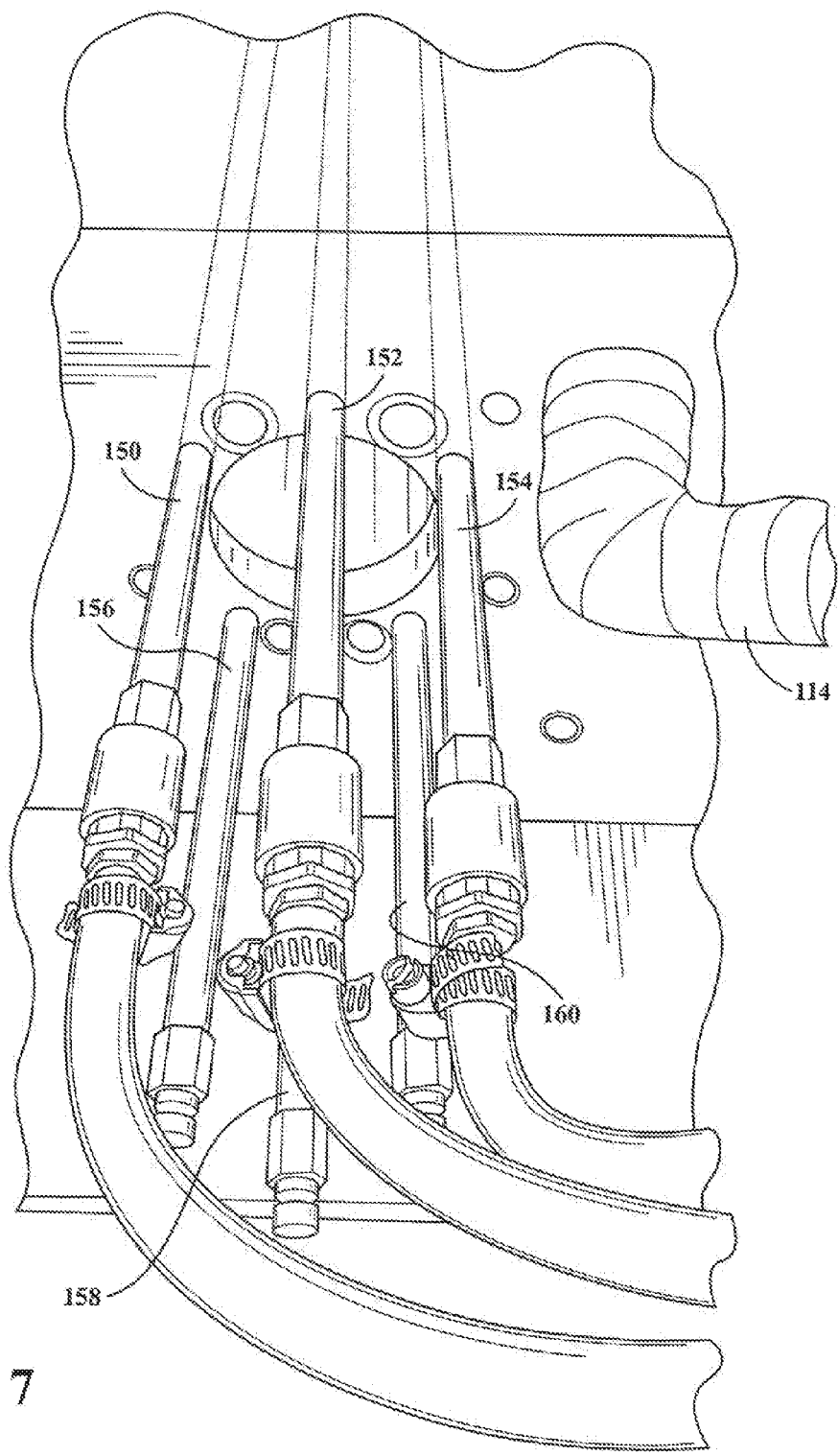
FIG. 7 is a rotated perspective of FIG. 6 and illustrating a plurality of cooling lines communicating to the cross head die and interior passageways formed into each of the elongated lobe forming mandrels for temperature control during the forming and attaching of the second stage parabolic shaped elastomeric portion.

The second extruder further includes independent temperature controls for each of the profile defining portions 118, 120, 122, et seq., associated with the elongated mandrel 116, these assisting in shaping the attachment interface between the arcuate/parabolic portion 24 and the first stage "L" bracket 12/14. The independent temperature controls for the elongated mandrel 116 further include pluralities of fluid lines, one non-limiting arrangement of which is shown in FIG. 7 at 150, 152, 154, 156, 158 and 160, and for communicating a coolant to each of the profile defining portions of the mandrel 116, such as which can further be dictated by separate thermo-electric coupling devices in communication with the mandrel.

Figure 8:
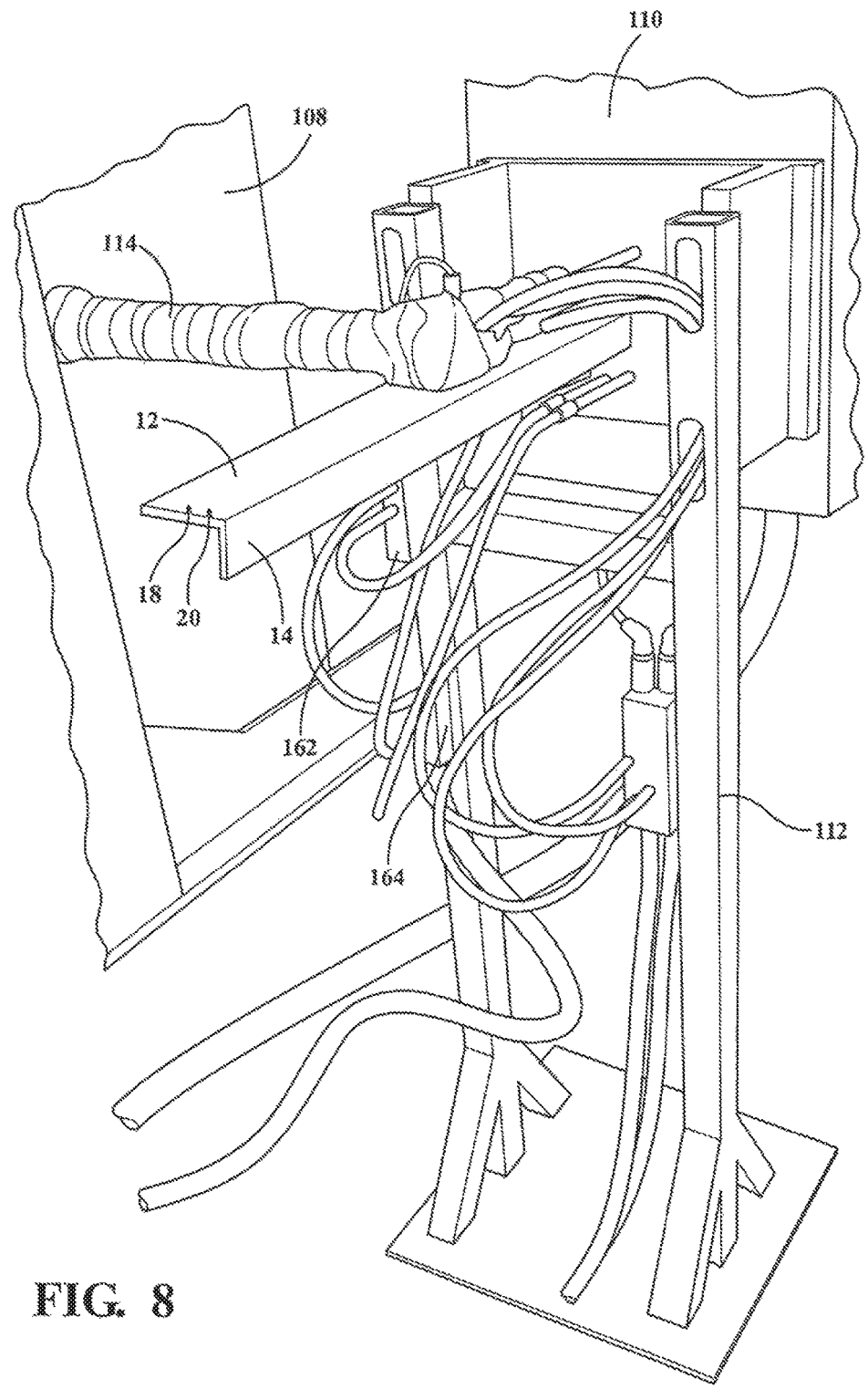
FIG. 8 is a back side perspective of the cross head die and stand and illustrating the arrangement of the inlet feed of coextruded and flowable material to the reverse side extending mandrel, as well as the plurality of coolant lines extending from the thermocouple controlled sub-assemblies for controlling the temperature profiles of the mandrel.
Figure 9:
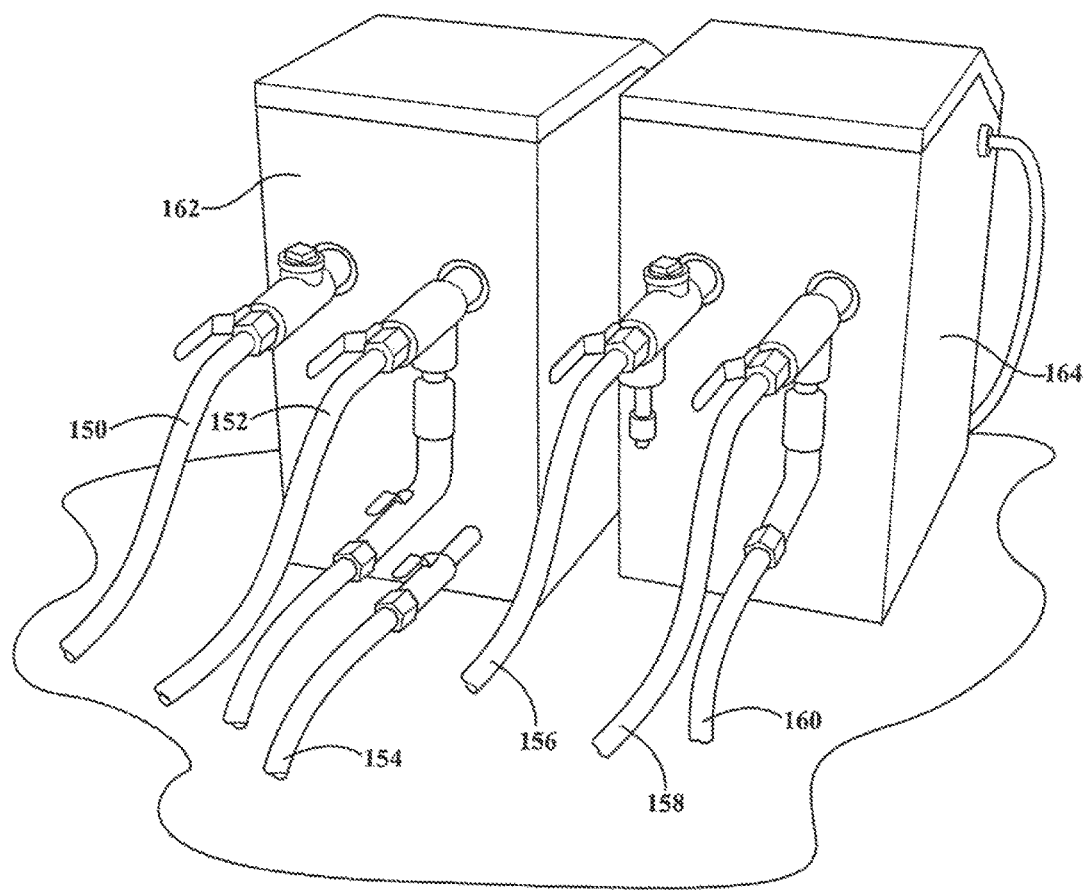
FIG. 9 is a side-by-side perspective of the coolant supply units also depicted in FIG. 8 and associated with the coolant lines and thermos-electric coupling devices extending to the parabolic shaped portion forming mandrel.
Figure 10:
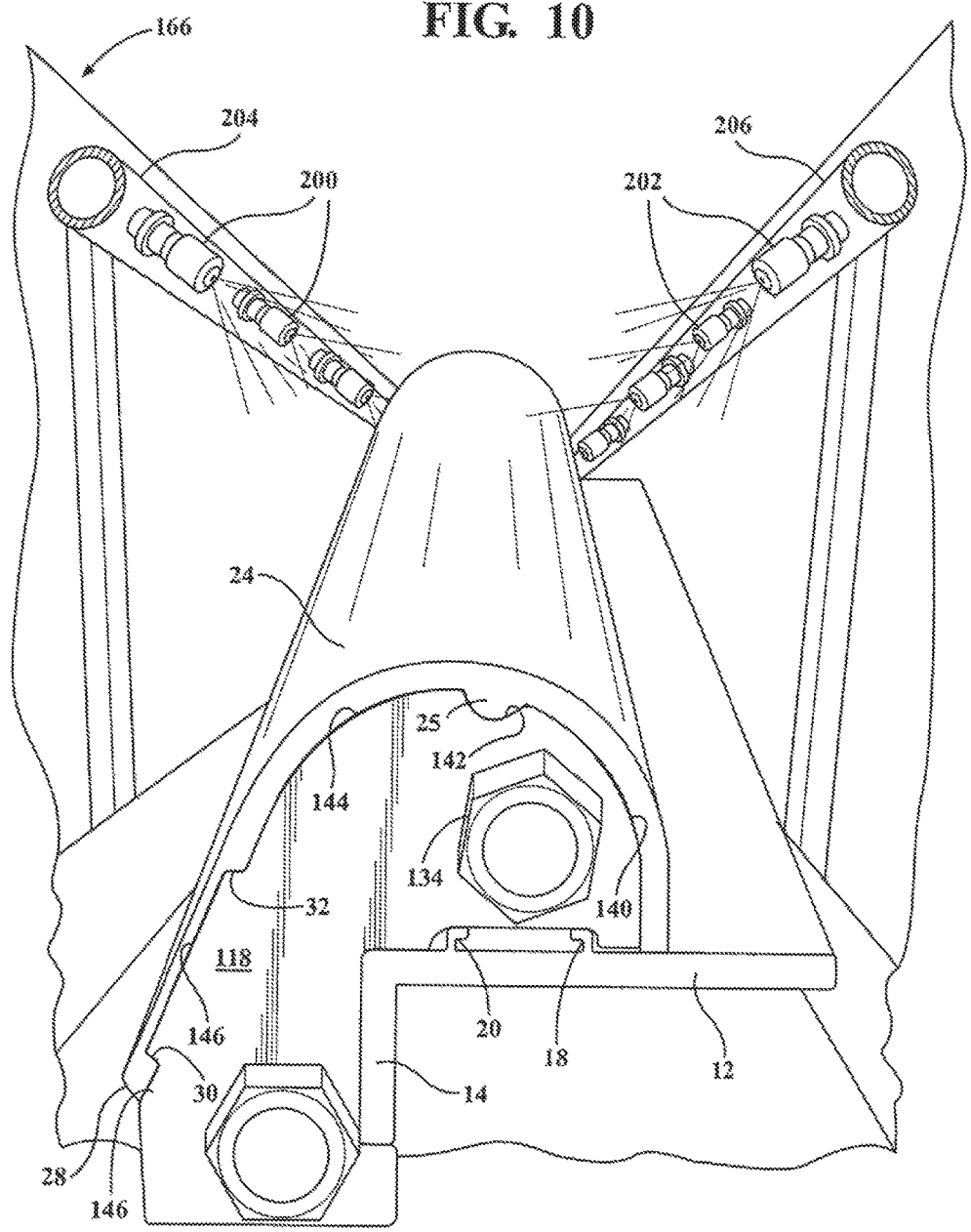
FIG. 10 is an end perspective of the parabolic shaped forming mandrel extending from the die head into the (spray or immersion) cooling and final shaping tank.

FIG. 8 is a back side perspective of the cross head die 110 and stand 112 and illustrating the arrangement of the inlet feed of coextruded and flowable material to the second stage arcuate portion defining mandrel 116, as well as the plurality of coolant lines 150-160 extending from a pair of fluid generating sub-assemblies (see as represented at 162 and 164 which may include internal pumps or the like for assisting in generating fluid flow through the mandrels) and for controlling the temperature profiles of the mandrels. The coolant lines extend to locations along the axial installed length of the mandrel 116, see at 150', 152', 154', et seq. in FIG. 12, this in order to control the temperature of the mandrel 116 at each forming location dining the second stage extrusion process for engaging the arcuate/parabolic portion 24 to the main first stage extruded "L" bracket, sides 12/14.

Also shown in FIG. 8 at 114 is a separate unit which may include any type of Thermalator® or thermo-electric coupling controls, these interfacing with the pump controlled upper 162 and lower 164 coolant subassemblies and associated valve structure in communicating with the fluid lines 150-160 in order to direct fluid through the interior of the elongated second stage forming mandrel 116.

In this manner, the surface temperatures of the mandrel 116 is independently controlled so as to assist in shaping and smoothing the inner wall of the attachable arcuate/parabolic shaped portion 24 of material as it is joined to lower side 12 of the previously formed "L" bracket, at location 26. At this point, the heat associated previous cross sectional offset or correction effectuated by the intercepting upper 66 and lower spaced apart 68 and 70 rollers into the cross sectional profile of the pipe is further deformed by the heat of the elongated mandrel 116 in the second stage extrusion process, such resulting in the creation of a two stage extruded marine bumper in which the inner single walled component reverts hack to a more precise perpendicularly angled relationship established between the sides 12/14.

Although not clearly shown, it is also understood that the linear dimensions of the mandrel 116 can be tapered or otherwise modified, such including an inward taper of 6% in one non-limiting variant between the crosswise dimensions taken from the cross head die 110 to the extending ends of the mandrel (this as further defined by the exterior surface dimensions established by each of the succeeding and linearly spaced forming portions 118, 120, 122, et seq., . . . 124, 126, and 128. The dimensioning of the second stage forming mandrel 116 is intended to counter the natural phenomena effects of the extrudate material for creating the arcuate portion 24 as it is formed, conjoined and hardened to the exterior location 26 of the "L" bracket lower side 12, and so that the resultant two stage extruded marine bumper exhibits consistent length and width dimensional profiles.

The mandrel 116 extends from cross head die 110 and into an interior of a cooling station 166. The cooling station 166 further includes a plurality of linearly spaced apart pairs of supporting spindles, these depicted in FIG. 13 at 168/170, 172/174, 176/178 et seq. between which traverses the two stage extruded marine bumper. The mandrel 116 extends between at least the first two pairs of spaced apart spindles 168/170 and 173/174 during the progressive second stage extrusion of the arcuate/parabolic portion 24 onto the first stage "L" bracket.

Without limitation, the pairs of spindles can each exhibit a modified spool shape, with each including upper and lower arcuate or otherwise shaped surfaces separated at an intermediate height by any type of ledge or profile shape for seating and translating the "L" bracket 12/14 and the co-extruded arcuate/parabolic portion 24. As such, the shaping of the spindles is such that the extruded profile of the portion 24 formed by the mandrel 116 rides between die upper and lower arcuate opposing surfaces of the pairs of spindles, with the cross sectional separation between the individually spaced forming portion 118, 120, 122, et seq. of the mandrel 116 and the previously extruded first stage "L" bracket 12/14 seating between the likewise opposing intermediate ledge of each spindle.

The construction of the spindles such including a metallic or any suitable supporting material, is also such that the spindles are capable of being inter-displaceable in at least one of first x 180 and second y 182 axes (see again FIG. 13) in response to contact with the co-extruded bumper as it is displaced there between. X axis displacement can be effectuated by rotatably supporting the spindles upon vertical mounting posts, these extending upwardly from a base interior surface of the cooling station 166 (likewise exhibited as an elongated three dimensional rectangular shaped structure with a generally open interior and having an inlet end 184 and an outlet end 186).

As further shown, a plurality of coil springs (see at 188, 190, 192 et seq.) equal in number to each respective pair of guiding spindles is provided and each includes opposite curled ends which engage the upper ends of each pair of vertical spindle support posts (see as depicted by palm of posts at 194, 196, 198, et seq. in FIG. 13). The posts can be configured so that they are allowed an incremental degree of lateral give or displacement (along axis x 180) in response to incidental contact between the extruded pipe and the spindles, thereby allowing the spindles to flex laterally against the biasing effect of the coil springs. As further clearly shown, y axis 182 displacement of the spindles is further easily accomplished by their vertical channel seating interiors (not shown but through which the posts extend) allowing the spindles to slide up and down along the respective pairs of vertical posts.

The cooling station 166 farther includes pluralities of nozzles, see at 200 and 202 and which are supported on opposite interior extending sides of the station 166 via fluid supply hues 204 and 206 (these in turn connected to remote coolant supply reservoirs) for supplying a spray coolant to the two stage extruded pipe as it translates through the station 166. As with the initial stage cooling station 90, spray coolant is collected at an interior drain basin within the station and recycled or drained as desired. Following exiting from the cooling station 166, the completed two stage extruded bumper is drawn through a puller 208 (FIG. 14) for sectioning at a subsequent operation 210 (also depicted by blade 212) in FIG. 12) for subdividing the finished bumper coextrusion into predetermined lengths.

An associated process for creating a two stage extruded marine or dock bumper is also provided and includes the steps of extruding a first "L" cross sectional shaped and elongated component, and sizing the first component within a chamber incorporating a series of linearly spaced sizing dies in order to maintain a shape of the first component during cooling thereof. Additional steps include extruding an arcuate/parabolic shaped elastomeric portion 24, such as from a second softer material, to an exterior surface of a lower interconnecting side 12 of the first stage extruded bracket, so that the extending end 28 of the arcuate portion 24 does not initially contact the edge profile 22 of the upper first bracket side 14. Other steps include cooling the two stage extruded bumper and sectioning into given lengths.

Other process steps drawn from the above assembly include inducing a negative pressure within the chamber, flattening first and second cross sectional locations of the first stage "L" bracket (if needed) prior to the step of extruding the arcuate/parabolic shaped portion 24, and cooling the first stage "L" bracket 12/14 prior to extruding the second stage and flexible arcuate/parabolic portion 24. Additional steps include independently controlling a temperature of each individual forming portion integrated within the elongated forming mandrel, this forming a portion of a crosshead die associated with the second stage extrusion, such including the use of coolant and thermos-electric coupling devices (or Thermalators®), and transitioning the co-extruded bumper fern the elongated lobe forming mandrels to a plurality of spaced apart pairs of supporting spindles during traversing of the elongated coextruded article through a second chamber downstream from the crosshead die. Final process steps also include cooling the two stage extruded bumper.

Having described our invention, other and additional preferred embodiments will become apparent to those skilled in the art to which it pertains, and without deviating from the scope of the appended claims.

We claim:

1. A process for creating a two stage extruded bumper, comprising the steps of:
   extruding a first cross sectional bracket shaped and elongated component;
   sizing the bracket shaped component within a chamber incorporating a series of linearly spaced sizing dies in order to maintain a shape of the first component during cooling thereof;
   extruding an arcuate flexible portion to a surface of the bracket, such that an extended end of the flexible portion is spatially arrayed relative to the bracket;
   said step of extruding the arcuate flexible portion to the surface of the bracket further including the step of independently controlling a temperature of an elongated forming mandrel forming a portion of a crosshead die associated with the extrusion of the flexible portion;
   said step of controlling a temperature of the elongated forming mandrel further including the step of communicating a coolant to each of a series of forming profiles arranged along the mandrel;
   shaping an attachment interface along the elongated forming mandrel between the extended end of the arcuate portion and the bracket portion;
   wherein said step of shaping the attachment interface further including the steps of shaping a first configuration at said extended end of said flexible portion and shaping a second configuration at an end surface of said bracket of said bracket shaped component;
   cooling the two stage extruded bumper; and
   sectioning the bumper into given lengths.

2. The process as described in claim 1, said step of sizing the bracket shaped component further comprising inducing a negative pressure within the chamber.

3. The process as described in claim 1, further comprising the step of flattening first and second cross sectional locations of the bracket shaped component prior to the step of extruding the arcuate flexible portion.

4. The process as described in claim 1, further comprising the step of cooling the bracket shaped component prior to extruding the arcuate flexible portion.

5. The process as described in claim 1, said step of cooling the two stage extruded bumper further comprising the step of transitioning the bumper from the elongated forming mandrel to a plurality of spaced apart pairs of supporting spindles during traversing of the bumper through a second chamber downstream from the crosshead die.

6. The process as described in claim 5, said step of cooling the two stage extruded bumper further comprising spraying in a second chamber.

7. The process as described in claim 1, said step of cooling the two state extruded bumper further comprising spraying within a first cooling tank.

8. A process for creating a two stage extruded bumper, comprising the steps of:
   extruding a first cross sectional bracket shaped and elongated component;
   sizing the bracket shaped component within a chamber incorporating a series of linearly spaced sizing dies in order to maintain a shape of the first component during cooling thereof;
   flattening first and second cross sectional locations of the bracket shaped component;
   extruding an arcuate flexible portion to a surface of the bracket, such that an extruded end of the flexible portion is spatially arrayed relative to the bracket;
   said step of extruding the arcuate flexible portion to the surface of the bracket further including the step of independently controlling a temperature of an elongated forming mandrel forming a portion of a crosshead die associated with the extrusion of the flexible portion;
   wherein the step of flattening occurs prior to the step of extruding the arcuate flexible portion;
   cooling the two stage extruded bumper;
   said step of cooling the two stage extruded bumper further including the step of transitioning the bumper from the elongated forming mandrel to a plurality of spaced apart pairs of supporting spindles during traversing of the bumper through a second chamber downstream from the crosshead die; and
   sectioning the bumper into given lengths.

9. An assembly for producing a two stage extruded bumper, comprising:
   a first extruder receiving a first extrudate material for forming a bracket shaped component;
   a second extruder including a cross head die, an elongated mandrel extending from an outlet of said cross head die, the bracket shaped component being communicated through said cross head die and along said elongated mandrel, a second extrudate material flowing through said cross head die and over said mandrel and conjoining along an edge thereof to the bracket shaped component in order to form an arcuate shaped portion extending from the bracket shaped component and so that a remote end of the arcuate portion is arrayed away from the bracket portion;

said second extruder further having independent temperature controls associated with each of a plurality of spaced apart guiding and forming portions associated with said mandrel and for assisting in shaping a subsequent attachment interface between the remote end of the arcuate portion and the bracket portion;

a cooling station in communication with an extending end of said elongated mandrel for receiving and supporting the two stage extruded bumper during cooling and hardening; and a puller communicating with an outlet of said cooling station for drawing the two stage extruded bumper and prior to cutting the co-extruded bumper to specified running lengths.

10. The assembly as described in claim 9, further comprising a vacuum chamber communicating with an outlet of said first extruder, a plurality of sizing dies being arranged in linearly spaced fashion within said vacuum chamber and through which passes the bracket-shaped component for maintaining a shape of the component during cooling thereof.

11. The assembly as described in claim 10, further comprising a plurality of rollers supported at an outlet end of said vacuum chamber and between which translates the bracket-shaped component in order to flatten first and second cross sectional locations thereof.

12. The assembly as described in claim 9, further comprising an infeed hopper for supplying thermoplastic pellets associated with said first extruder.

13. The assembly as described in claim 9, further comprising a secondary cooling station located between said first and second extruders, said secondary cooling station including a plurality of nozzles for supplying a spray coolant to the bracket shaped component.

14. The assembly as described in claim 9, said independent temperature controls for said elongated mandrel further comprising a plurality of fluid lines for communicating a coolant to each of the spaced apart and guiding portions.

15. The assembly as described in claim 9, said cooling station further comprising a plurality of linearly spaced apart pairs of supporting spindles, between which traverses the two stage extruded pipe, said spindles being inter-displaceable in at least one of first and second axes in response to contact with the bumper.

16. The assembly as described in claim 15, said cooling station further comprising a plurality of nozzles for supplying a spray coolant to the two stage extruded bumper.

17. The assembly as described in claim 9, said elongated mandrel further comprising a pair of elongated stems interconnecting said plurality of spaced apart guiding and forming portions, said stems each including an exteriorly threaded profile for receiving pairs of threaded nuts located on sides of each forming portion, said forming portions likewise being apertured for receiving the stems in extending fashion there through, with rotational to linear adjustability via the opposite surface adhering pairs of nuts in order to spatially inter-adjust the spatial positioning of said individual forming portions as desired based upon parameters of the second stage extrusion process.

18. The assembly as described in claim 9, each of said plurality of spaced apart guiding and forming portions of said elongated mandrel further comprising a plurality of individual and interconnecting cross sectional profile surface defining portions, collectively defining an extruded profile of the arcuate extending portion, said interconnecting profile surface defining portions including at least a first surface portion defining a base connecting portion of the arcuate portion mounting to the bracket shaped component, a further portion defining an intermediate adjoining range of the arcuate shaped portion, and a terminating portion defining an embossment location corresponding to the creation of an underside cavity at the remote end of the arcuate portion for subsequently pivoting into engaged contact with a top end of the bracket shaped component.

* * * * *